US008277746B2

(12) United States Patent
Singh et al.

(10) Patent No.: US 8,277,746 B2
(45) Date of Patent: Oct. 2, 2012

(54) APPARATUS, SYSTEM AND METHOD FOR FACILITATING TRANSFER OF HIGH LEVEL RADIOACTIVE WASTE TO AND/OR FROM A POOL

(75) Inventors: Krishna P. Singh, Jupiter, FL (US); Stephen J. Agace, Marlton, NJ (US)

(73) Assignee: Holtec International, Inc.

( * ) Notice: Subject to any disclaimer, the term of this patent is extended or adjusted under 35 U.S.C. 154(b) by 52 days.

(21) Appl. No.: 12/891,125

(22) Filed: Sep. 27, 2010

(65) Prior Publication Data

US 2012/0226088 A1 Sep. 6, 2012

Related U.S. Application Data

(62) Division of application No. 11/775,843, filed on Jul. 10, 2007, now Pat. No. 7,820,870.

(60) Provisional application No. 60/819,568, filed on Jul. 10, 2006.

(51) Int. Cl.
*B01D 15/00* (2006.01)

(52) U.S. Cl. ........................................ 422/271; 588/900

(58) Field of Classification Search .................. 422/271, 422/261, 266, 269, 903; 588/900
See application file for complete search history.

(56) References Cited

U.S. PATENT DOCUMENTS

| | | | |
|---|---|---|---|
| 3,229,096 | A | 1/1966 | Bonilla et al. |
| 3,414,727 | A | 12/1968 | Bonilla |
| 3,669,299 | A | 6/1972 | Jones et al. |
| 3,765,549 | A | 10/1973 | Jones |
| 3,780,306 | A | 12/1973 | Anderson et al. |
| 3,845,315 | A | 10/1974 | Blum |
| 3,886,368 | A | 5/1975 | Rollins et al. |
| 3,910,006 | A | 10/1975 | James |
| 3,917,953 | A | 11/1975 | Wodrich |
| 3,962,587 | A | 6/1976 | Dufrane et al. |
| 3,982,134 | A | 9/1976 | Housholder et al. |
| 4,069,923 | A | 1/1978 | Pignata et al. |
| 4,147,938 | A | 4/1979 | Heckman et al. |
| 4,197,467 | A | 4/1980 | Williams |
| 4,288,698 | A | 9/1981 | Baatz et al. |
| 4,336,460 | A | 6/1982 | Best et al. |
| 4,450,134 | A | 5/1984 | Soot et al. |
| 4,532,104 | A | 7/1985 | Wearden et al. |
| 4,535,250 | A | 8/1985 | Fields |
| H152000 | | 11/1986 | Lampe |
| 4,636,645 | A | 1/1987 | Kessinger |
| 4,672,213 | A | 6/1987 | Stoll et al. |
| 4,738,388 | A | 4/1988 | Bienek et al. |
| 4,759,912 | A | 7/1988 | Taley Arkhan |
| 4,780,269 | A | 10/1988 | Fischer et al. |
| 4,788,029 | A | 11/1988 | Karjean |
| 4,800,062 | A | 1/1989 | Craig et al. |
| 4,800,283 | A | 1/1989 | Efferding |
| 4,914,306 | A | 4/1990 | Dufrane et al. |
| 5,513,232 | A | 4/1996 | Jones et al. |
| 5,546,436 | A | 8/1996 | Jones et al. |
| 5,550,882 | A | 8/1996 | Lehnert et al. |
| 5,643,350 | A | 7/1997 | Mason et al. |
| 5,646,971 | A | 7/1997 | Howe |
| 5,651,038 | A | 7/1997 | Chechelnitsky et al. |
| 5,661,768 | A | 8/1997 | Gilligan et al. |
| 6,064,711 | A | 5/2000 | Copson |
| 6,323,501 | B1 | 11/2001 | White et al. |
| 6,587,536 | B1 | 7/2003 | Singh et al. |
| 7,330,525 | B2 | 2/2008 | Singh et al. |
| 2011/0172484 | A1 * | 7/2011 | Singh et al. .................... 588/16 |

FOREIGN PATENT DOCUMENTS

| | | |
|---|---|---|
| EP | 0314025 | 5/1989 |
| EP | 0561694 | 9/1993 |
| FR | 2317737 | 2/1977 |
| FR | 2471029 | 6/1981 |
| FR | 2530065 | 1/1984 |
| WO | WO9739454 | 10/1997 |

* cited by examiner

*Primary Examiner* — Edward Johnson
(74) *Attorney, Agent, or Firm* — The Belles Group, P.C.

(57) ABSTRACT

A method, apparatus and system for the transferring a container for receiving high level radioactive waste into and/or out of a pool. The instant invention utilizes a specially designed container in order to make effective use of a stand placed within the pool. In one embodiment, the invention is a system for transferring high level radioactive waste comprising: a container for receiving high level radioactive waste, the container having a support structure; a stand comprising a cavity for receiving the container and an opening forming a passageway into the cavity; wherein the support structure is sized, shaped and/or arranged so that: (i) when the container is substantially vertically oriented in a first rotational position, the support structure can not pass through the opening due to contact between the support structure and the stand; and (ii) when the substantially vertically oriented container is rotated an angle about a vertical axis to a second rotational position, the support structure can pass through the opening in an unobstructed manner.

15 Claims, 21 Drawing Sheets

APPARATUS, SYSTEM AND METHOD FOR FACILITATING TRANSFER OF HIGH LEVEL RADIOACTIVE WASTE TO AND/OR FROM A POOL

CROSS-REFERENCE TO RELATED PATENT APPLICATIONS

The present application is a divisional of U.S. patent application Ser. No. 11/775,843, filed on Jul. 10, 2007 now U.S. Pat. No. 7,820,870, which claims the benefit of U.S. Provisional Patent Application 60/819,568, filed Jul. 10, 2006, the entireties of which is hereby incorporated by reference.

BACKGROUND OF THE INVENTION

The invention relates to the field of transporting and storing high level waste. In particular, the invention relates to a system, method and apparatus for transferring high level waste to and from a spent fuel pool.

In the operation of nuclear reactors, it is necessary to remove fuel assemblies after their energy has been depleted down to a predetermined level for continued reactor operations. Fuel assemblies are typically an assemblage of long, hollow, zircaloy tubes filled with enriched uranium. Upon depletion and subsequent removal from the reactor, spent nuclear fuel is still highly radioactive and produces considerable heat, requiring that great care be taken in its packaging, transporting, and storing. Specifically, spent nuclear fuel emits extremely dangerous neutrons and gamma photons. It is imperative that these neutrons and gamma photons be contained at all times.

In defueling a nuclear reactor, the spent nuclear fuel is removed from the reactor and placed in a canister that is submerged in a spent nuclear fuel pool. The pool facilitates cooling of the spent nuclear fuel and provides radiation shielding in addition to that which is supplied by the canister. Because it is preferable to store spent nuclear fuel in a "dry state," the canister must eventually be removed from the spent nuclear fuel pool. However, the canister alone does not provide adequate containment of the radiation. As such, apparatus that provide additional radiation shielding during the transport and long-term storage of the spent nuclear fuel are necessary. In state of the art facilities, this additional radiation shielding is achieved by placing the loaded canisters in large cylindrical containers called casks. There are two types of casks used in the industry today, storage casks and transfer casks.

A storage cask is used to store spent nuclear fuel in the "dry state" for long periods of time. Typically, storage casks weigh approximately 150 tons and have a height greater than 15 feet. Storage casks are generally too heavy to be lifted by most nuclear power plant cranes and they are too large to be placed in spent nuclear fuel pools. Thus, in order to store a canister of spent nuclear fuel in a storage cask, the canister must be removed from the pool, prepared in a staging area, and transported to the storage cask.

A transfer cask facilitates removal from the fuel pool and transport of the loaded canister to the storage cask. In facilities utilizing transfer casks to transport loaded canisters, an empty canister is placed into the cavity of an open transfer cask. The canister and transfer cask are both submerged in the spent nuclear fuel pool. As each assembly of spent nuclear fuel is depleted, it is removed from the reactor, lowered into the fuel pool and placed in the submerged canister (which is within the transfer cask). The loaded canister is then fitted with its lid, enclosing the spent nuclear fuel and water from the pool within. The canister and transfer cask are then removed from the pool and set down in a staging area to prepare the spent nuclear fuel for storage in the "dry state."

The placement of the canister and transfer cask into the fuel pool, loading of the spent nuclear fuel into the transfer cask and the removal of the loaded transfer cask from the fuel pool are carried out by using a high-load capacity overhead crane. FIG. 1 shows a typical high-load capacity overhead crane used for placing cask 7 within fuel pool 4. The crane comprises crane block 11, cables 12, sling 13, extension 10 and yoke 9. Connected to crane block 11 is sling 13 which is connected to extension 10, which is connected to lift yoke 9 that is attached to cask top 8 in order to lift cask 7. Crane block 11 needs to be high enough to allow cask 7 to be lifted over edge 3 of spent fuel pool 4. It is highly desirable that crane block 11, cables 12 and other important crane elements not be immersed in the fuel pool water. If crane block 11 and cables 12 contact the fuel pool water, they will become contaminated. Contamination of the crane block 11 and cables 12 is undesirable because these components are often used outside of the proscribed areas of the nuclear facility. If crane block 11 and cables 12 are contaminated, then it is almost impossible to decontaminate the equipment itself and the grease and oils used for lubricating the equipment. FIG. 2 shows cask 7 fully lowered into fuel pool 4 while crane block 11, cables 12 and sling 13 remain dry. This shows the ideal configuration for cask 7 placement in the fuel pool 4.

A common architectural limitation of nuclear plants pertains to a deep fuel pool wherein the crane bridge is situated at a relatively low elevation above the pool deck. At such plants, placing the heavy transfer cask on the bottom of the fuel pool, i.e. on the fuel pool liner 5, results in the undesirable situation of the crane block 11 and cables 12 being immersed in the pool's contaminated water. Some plants deal with this limitation by making a two-tiered fuel pool having a shallow tier and a deep tier. This allows cask 7 to be lowered in two stages; the first stage using just lift yoke 9 and the second stage using lift yoke 9 with extension 10. The shallow tier serves as a platform for the following changeover procedure: while the crane block 11 is kept at its maximum elevation, cask 7 is placed on the shallow tier, then an extension 10 of suitable length is installed so that the crane block 11 can remain at its maximum elevation while lowering the transfer cask 7 into the deep tier. The extension 10 serves to keep the crane block 11 and cables 12 above the fuel pool water as the transfer cask 7 is picked up from the shallow tier and lowered to the bottom of the deep tier. The reverse procedure is performed when removing the loaded transfer cask from the fuel pool. Creating a two-tiered fuel pool is an inefficient and costly use of the limited space available in nuclear plants because the entire shallow tier is useful only as the surface for the crane parts changeover. Moreover, many sites do not even have the necessary space or structural means to establish a two tiered pool. Other measures, such as wrapping the crane block in plastic are only partially effective in keeping the crane block and cables from becoming contaminated.

Thus, a need exists for providing an effective and cost efficient way to protect the crane block and cables from contamination by the fuel pool water during fuel pool operations in plants having a crane bridge of low elevation and/or a deep fuel pool.

SUMMARY OF THE INVENTION

It is therefore an object of the present invention to provide a system, method and apparatus for transferring high level radioactive waste.

It is another object of the present invention to provide a system, method and apparatus for transferring high level radioactive waste to and/or from a pool that keeps critical components of the crane dry.

It is another object of the present invention to provide a cost effective and efficient system, method and apparatus for transferring containers into and out of a fuel pool without contaminating critical parts of the crane.

It is a further object of the present invention is to provide a system, method and apparatus for supporting a fully loaded submerged transfer cask above a floor of a pool.

It is a yet further object of the present invention to provide a method and apparatus for supporting a transfer cask in a substantially vertical orientation within a pool that keeps the transfer cask from overturning during a seismic event.

It is a yet further object of the present invention to provide a method and apparatus for supporting a transfer cask in a substantially vertical orientation within a pool that prohibits inadvertent rotation of the transfer cask about its vertical axis.

A yet further object of the present invention is to provide a system, method and apparatus that provides a cost effective alternative to two-tiered pools.

Still another object of the present invention is to provide a method and apparatus for supporting a transfer cask above floor level that does not hinder the free movement of spent fuel assemblies or other high level radioactive waste into the transfer cask.

Another object of the present invention is to provide a system, method and apparatus for transferring spent nuclear fuel into and out of a fuel pool that keeps critical components of the crane dry.

A still further object of the present invention is to provide a method and apparatus for moving high level radioactive waste into and out of a pool that does not require modifications to the crane lift elevation.

Another object of the present invention is to provide a system, method and apparatus for supporting a transfer cask in a pool that utilizes the load bearing portions of the pool.

These and other objects are met by the present invention which in one aspect may be a system for transferring high level radioactive waste comprising: a container for receiving high level radioactive waste, the container having a support structure; a stand comprising a cavity for receiving the container and an opening forming a passageway into the cavity; wherein the support structure is sized, shaped and/or arranged so that: (i) when the container is substantially vertically oriented in a first rotational position, the support structure can not pass through the opening due to contact between the support structure and the stand; and (ii) when the substantially vertically oriented container is rotated an angle about a vertical axis to a second rotational position, the support structure can pass through the opening in an unobstructed manner.

In another aspect the invention may be a method of transferring high level radioactive waste from a pool comprising: a) positioning a stand in a pool, the stand having a cavity, an opening forming a passageway into the cavity, and a top surface surrounding at least a portion of the cavity; b) lowering a container having a support structure and a vertical axis into the pool using a lift assembly having a length; c) positioning the container atop the stand so that the support structure contacts a top surface of the stand, the container being at a first rotational position about the vertical axis, the stand supporting the container; d) extending the length of the lift assembly; e) rotating the container about the vertical axis to a second rotational position; and f) lowering the container into the cavity of the stand, the support structure passing through the opening of the stand.

In yet another aspect the invention may be a method of transferring high level radioactive waste from a pool comprising: a) positioning a stand in a pool, the stand having a cavity; b) lowering a container having a vertical axis into the pool using a lift assembly having a length; c) positioning the container atop the stand so that the container is at a first rotational position about the vertical axis, the stand supporting the container; d) extending the length of the lift assembly; e) rotating the container about the vertical axis to a second rotational position; and f) lowering the container into the cavity of the stand.

In another aspect the invention may be an apparatus for facilitating the transfer of a container for receiving high level radioactive waste into and/or out of a pool, the container comprising a support structure, the apparatus comprising: a stand comprising a cavity for receiving the container and an opening forming a passageway into the cavity; wherein the opening is sized, shaped and/or arranged so that: (i) when the container is substantially vertically oriented in a first rotational position, the support structure can not pass through the opening due to contact between the support structure and the stand; and (ii) when the substantially vertically oriented container is rotated an angle about a vertical axis to a second rotational position, the support structure can pass through the opening in an unobstructed manner.

These and various other advantages and features of novelty that characterize the invention are pointed out with particularity below. For a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE DRAWINGS

Figure 1:
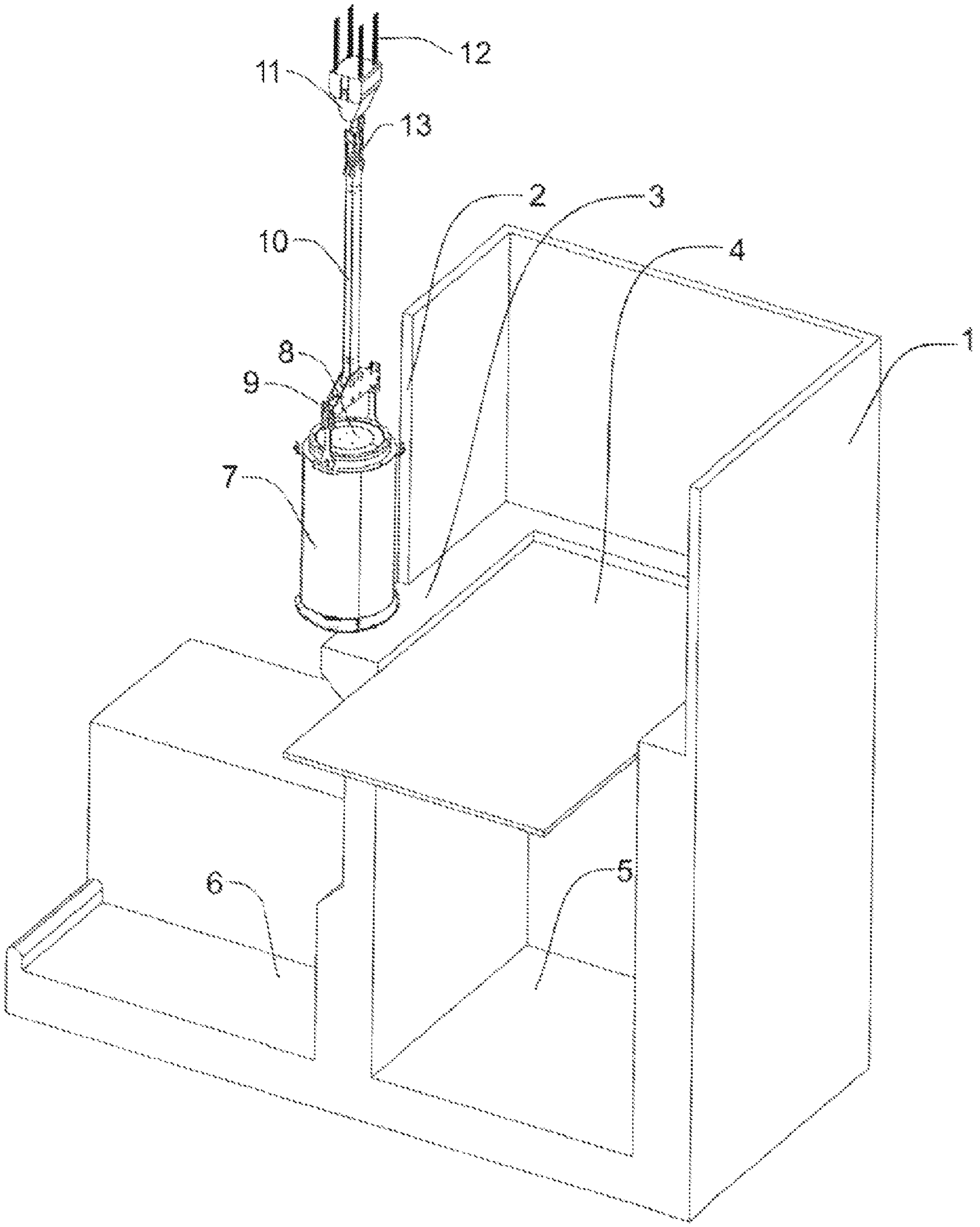
Figure 1 Prior Art
FIG. 1 is a perspective view illustrating a prior art method of transferring a cask into a spent fuel pool.
Figure 2:
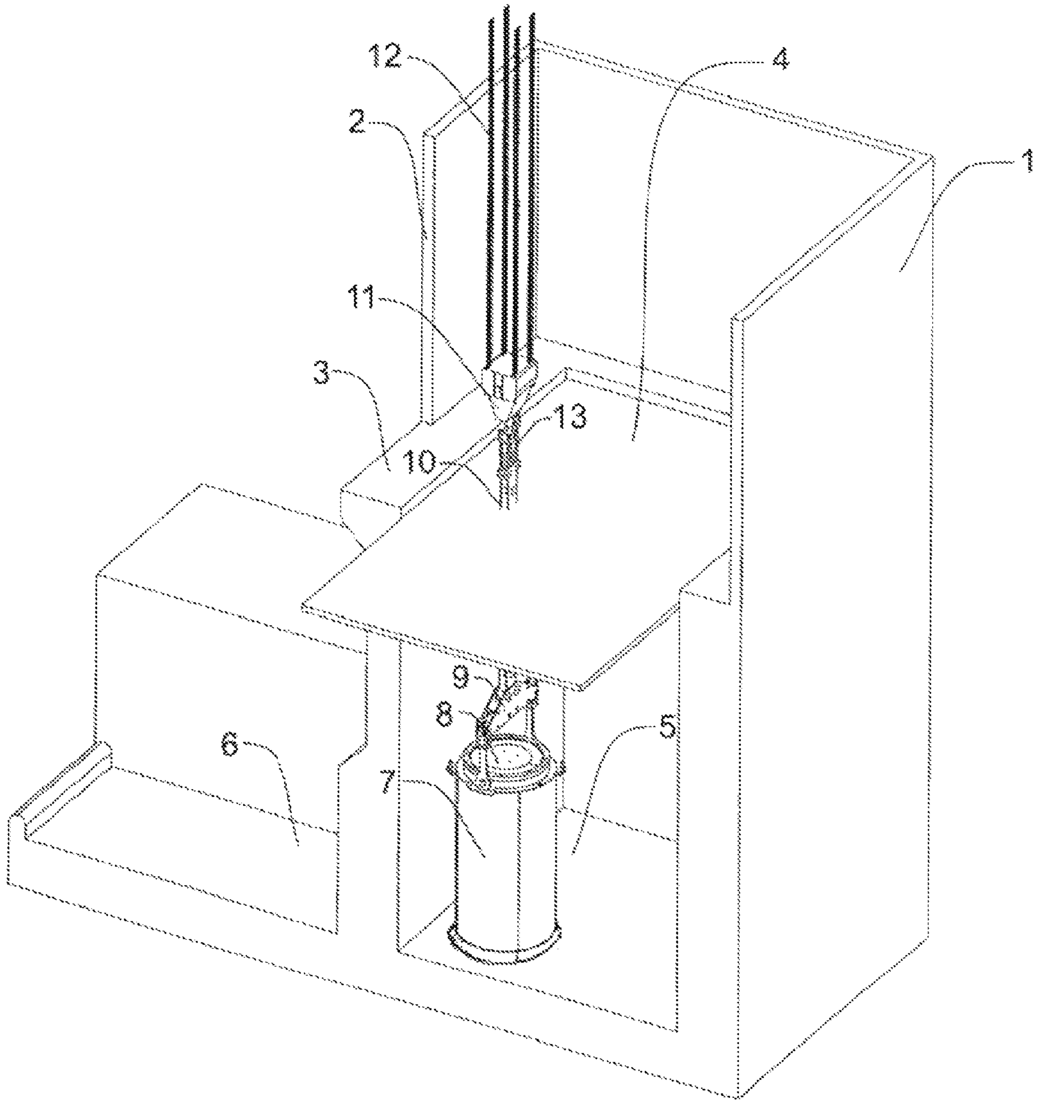
Figure 2 Prior Art
FIG. 2 is a perspective view illustrating the method of FIG. 1 wherein the cask is positioned at the bottom of the spent fuel pool.
Figure 3:
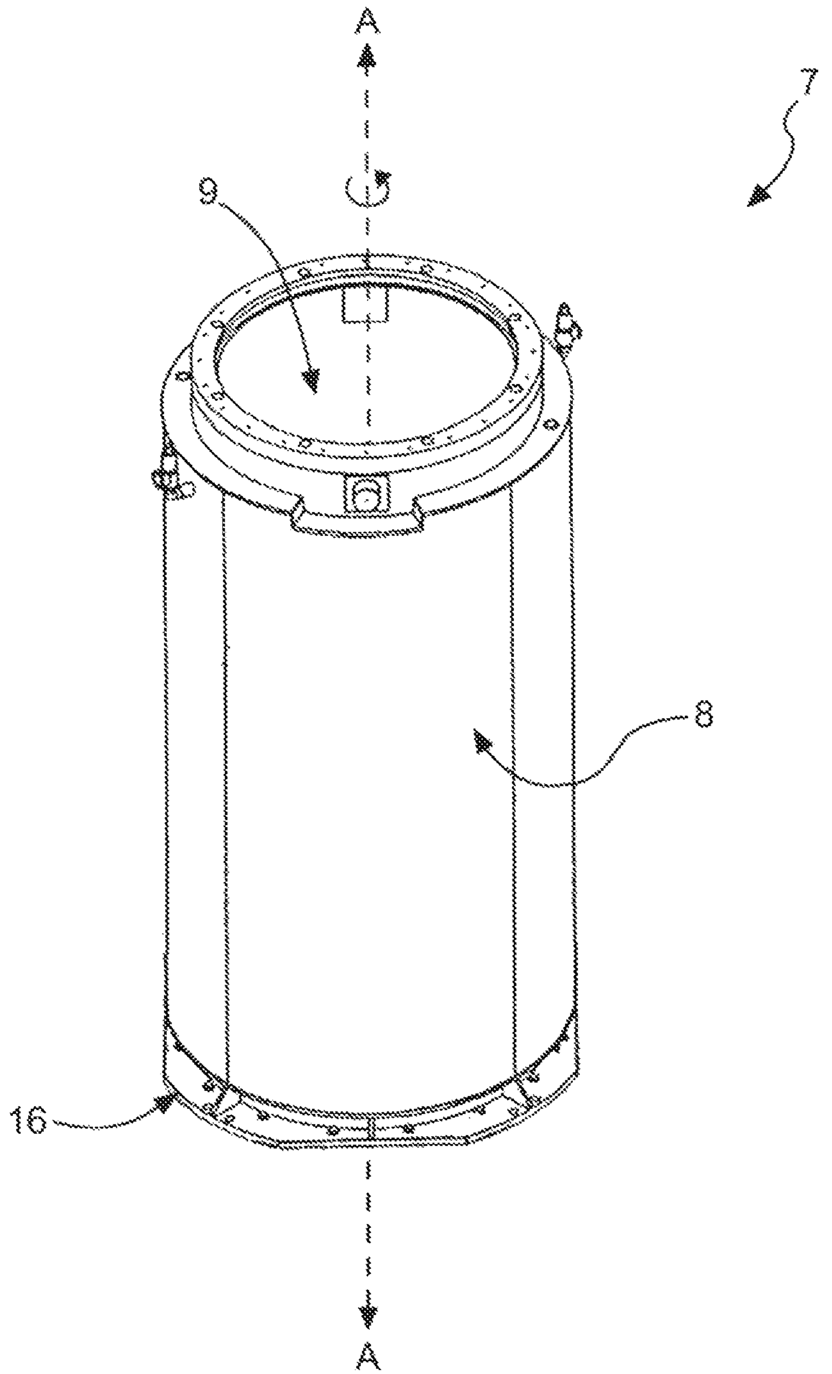
FIG. 3 is a perspective view of a transfer cask according to one embodiment of the present invention.

Referring first to FIG. 3, an embodiment of a transfer cask 7 is illustrated according to one embodiment of the present invention. The cask 7 comprises a body portion 8 that forms a storage cavity 9 for receiving high level radioactive waste, such as spent nuclear fuel rods. The body portion 8 of the cask 7 has an open top end and a closed bottom end. The open top end provides access to the storage cavity 9 for inserting and removing high level radioactive waste during loading and unloading procedures.

The cask 7 is designed so as to be oriented in a substantially vertical orientation during transfer procedures. The cask 7 is in a substantially vertical orientation in FIG. 3 and, thus, has a substantially vertical axis A-A. While a cask 7 is illustrated as the container to be used in the inventive transfer system and method, any container suitable for holding, storing and/or transferring high level radioactive waste can be used.

The cask 7 further comprises a support structure 16, which is in the form of a flange. The support structure 16 circumferentially surrounds and extends from the outer surface of the body portion 8 of the cask 7. The support structure is 16 connected to the cask 7 at or near the bottom end of the cask 7. While having the support structure 16 located at or near the bottom end of the cask 7 is preferable, the invention is not so limited in other embodiments. For example, the support structure can be located at or near the middle or top of the cask 7 if desired.

The support structure 16 can be made of stainless steel, metal, metal alloys, or any material of sufficient strength to withstand the loading requirements. The support structure 16 is designed to be sufficiently robust so that it can withstand the weight of the cask 7 when it is fully loaded with spent nuclear fuel and fuel pool water.

In the illustrated embodiment, the support structure 16 is exemplified as a continuous flange that circumferentially surrounds and extends from the body portion 8 of the cask. The support structure 16, however, can take on a wide variety of embodiments so long as it can achieve the desired functional cooperation with the stand 14 that will be described in greater detail below. For example, the support structure 16 could be a segmented flange, a plurality of pins, a plurality of trunnions and/or any structure sufficiently resilient and/or strong enough to withstand the necessary support and load requirements. Moreover, while the support structure 16 is described as being a component of the cask 7 for ease of discussion, the support structure 16 can be an integral portion or surface of the cask 7 itself. For example, and without limitation, the support structure 16 could be the bottom surface of the cask 7 itself.

Figure 4:
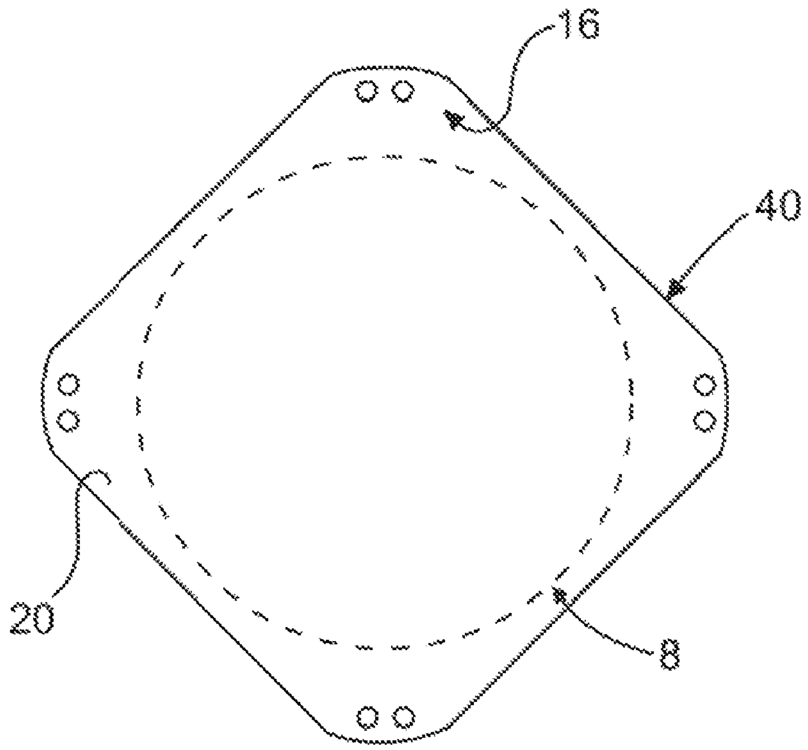
FIG. 4 is a bottom schematic view of the support structure of the transfer cask of FIG. 3.

Referring now to FIG. 4, a bottom schematic view of the support structure 16 is illustrated so that its horizontal cross-sectional profile can be clearly observed. The support structure 16 is specialty sized and shaped so that the desired relative cooperation with the opening 130 of the stand 14 is achieved. This desired relative cooperation between the cask 7 and the stand 14 will be discussed in relation to FIGS. 11A-11B below.

Referring still to FIG. 4, the support structure 16 has an external perimeter 40 that forms a horizontal cross-sectional profile, which in the illustrated embodiment of FIG. 4 is a generally square shape with rounded edges. The invention, however, is not limited to any specific horizontal cross-sectional profile and/or size of the support structure 16. For example, in some embodiments, the horizontal cross-sectional profile of the support structure 16 can be rectangular, triangular, hexagonal, octagonal, oval or irregular shaped. The exact horizontal cross-sectional profile and/or size of the support structure 16 will be dictated by the geometry and dimensions of the opening 130 of the stand 14, or vice versa.

The support structure 16 has a bottom surface 20. The bottom surface 20 of the support structure 16 extends horizontally from the body portion 8 of the cask 7. However, in alternative embodiments, the bottom surface 20 could extend at any angle from the body of cask 7. While the bottom surface 20 of the support structure 16 is a flat surface in the illustrated embodiment, the bottom surface 20 of the support structure 16 can be of any contour, including without limitation, stepped or curved. The bottom surface 20 is preferably designed to cooperate with a top surface of the stand 14 so that when the cask 7 is positioned atop the stand 14 (as shown in FIG. 6), the cask 9 is supported by the stand 14 in a substantially vertical orientation.

Figure 5:
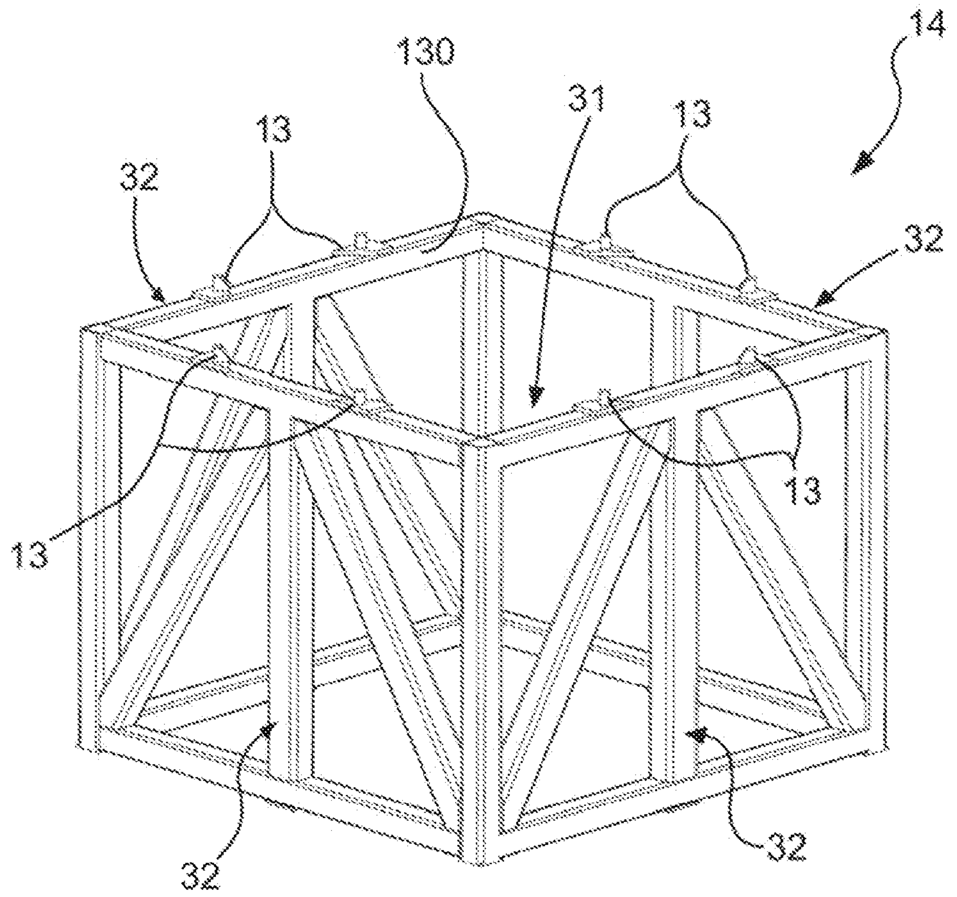
FIG. 5 is a perspective view of a stand according to one embodiment of the present invention.

Referring now to FIG. 5, a stand 14 according to an embodiment of the present invention is illustrated. The stand 14 is a rigid box-like structure comprising four interconnected side walls 32. The side walls 32 of the stand 14 are formed by a plurality of beams arranged so that the stand 14 is strong enough to support a fully loaded cask 7.

The stand 14 comprises a cavity 31 formed between the side walls 32. The cavity 31 is sized so as to be capable of accommodating the cask 7 (when the cask 7 is in the proper rotational position). While the cavity 31 is shown as enclosed by side walls 32 of stand 14, the invention is not so limited and the cavity 31 can be a space with open sides, closed sides, an open bottom end, or a closed bottom end. The stand 14 has a top surface 30 that is formed by the upper surfaces of the interconnected walls 32. The top surface 30 comprises/forms an opening 130. The opening 130 forms a passageway downward into the cavity 31 of the stand 14.

Figure 6:
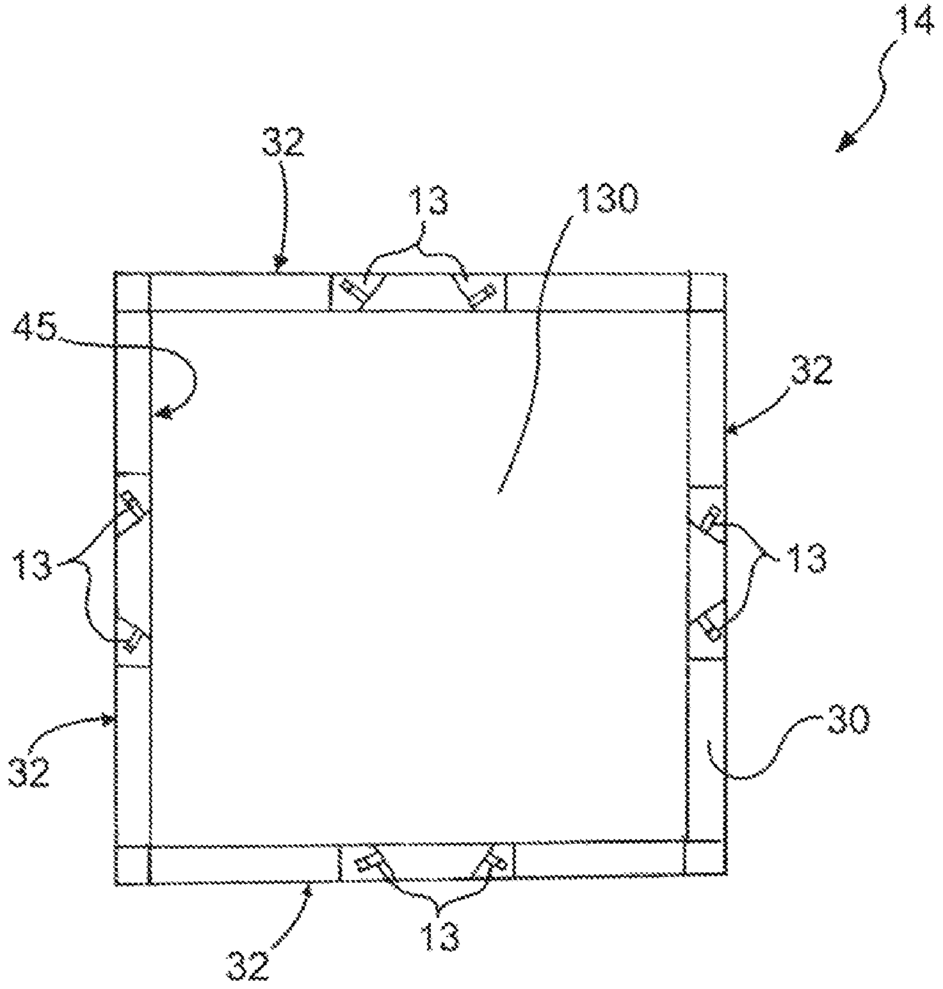
FIG. 6 is a top schematic view of the stand of FIG. 5.

Referring now to FIG. 6, the opening 130 of the stand has a horizontal cross sectional profile formed by the internal perimeter 45 of the top surface 30 of the stand 14. The horizontal cross sectional profile of the opening 130 of the exemplified embodiment of the stand 14 is square. The invention, however, is not limited to any specific horizontal cross-sectional profile and/or size of the opening 130 of the stand 14. For example, in some embodiments, the horizontal cross-sectional profile of the opening 130 can be without limitation rectangular, triangular, hexagonal, octagonal, or irregular shaped. The exact horizontal cross-sectional profile and/or size of the opening 130 will be dictated by the geometry and dimensions of the support structure 16 for which it is designed to cooperate with, or vice versa.

More specifically, the horizontal cross-sectional profiles of the opening 130 and/or the support structure 16 are sized and shaped relative to one another so that: (1) when the cask 7 is substantially vertically oriented and in a first rotational position, the support structure 16 can not pass through the opening 130 due to surface contact between the bottom surface 20 of the support structure 16 and the top surface 30 of the stand 14 (see FIG. 11A); and (2) when the cask 7 is substantially vertically oriented and rotated a nonzero angle about the vertical axis A-A to a second rotational position, the support structure 16 can pass through the opening 130 in an unobstructed and unimpeded manner (see FIG. 11B).

As used herein, the top surface 30 of the stand 14 generally refers to that surface of the stand 14 which, as discussed below, contacts the support structure 16 of the cask 7 when the cask 7 is in certain rotational positions, thereby prohibiting the cask 7 from entering the cavity 31. Thus, while the top surface 30 of the exemplified stand 14 is formed by the upper surfaces of the side walls 32, the top surface 30 is not so limited. For example, the top surface 30 could be formed by a ledge or catches within the stand 14 or the upper surface of another structure of the stand 14. Additionally, the top surface 30 does not have to be a continuous and/or flat surface, so long as sufficient surface exists to support the cask 7.

The stand 14 can likewise take on a wide variety of embodiments and is not limited to a frame like box structure, so long as the functional objectives discussed below can be accomplished. For example, the stand can be without limitation a shell-like structure, a plurality of vertically oriented and spaced apart posts, or any structure or combination of structures that can support the cask 7 by surface contact with the support structure 16.

Figure 9:
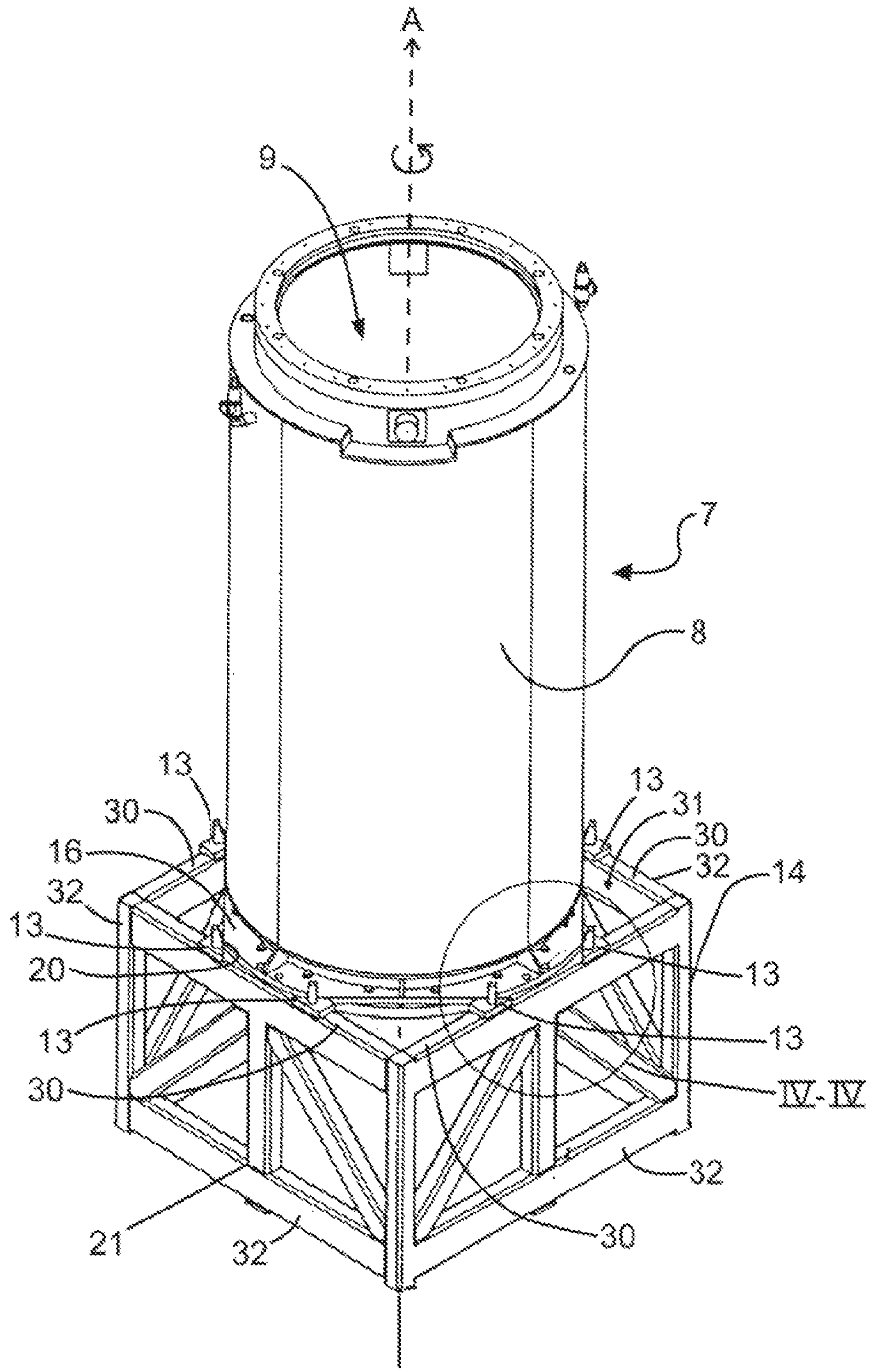
FIG. 9 is a perspective view of the transfer cask resting atop the stand as shown in FIG. 8.

Referring back to FIG. 5, the stand 14 further comprises a plurality of stoppers 13. The stoppers 13 are provided to prevent undesired rotation of the cask 7 about its vertical axis A-A when the cask 7 is positioned atop stand 14 (as shown in FIG. 9). The stoppers 13 extend upward from the top surface 30 of the stand 14. The stoppers 13 are arranged in functional pairs, with one pair of stoppers 13 being centrally located on each side wall 32.

The individual stoppers 13 in each pair of stoppers 13 are spaced from one another so that a portion of the support structure 16 can rest on the top surface 30 of the stand 14 between the stoppers 13. The positioning of the stoppers 13 allows the cask 7 to rest freely on the top surface 30 of the stand 14 while preventing the cask 7 from rotating about its vertical axis A-A (FIG. 3).

The stoppers 13 comprise a base 23 and a bracket 24. The brackets 24 have inclined upper surfaces to guide the portions of the support structure 16 into the desired position between the stoppers 13 during the initial lowering of the cask 7. The invention, however, is not so limited and the brackets 24 do not have to be angled. The stoppers 13 may be any shape so long as the stoppers 13 can prevent rotation of the cask 7 about its vertical axis A-A when the cask 7 is resting atop the stand 14. Thus, the stoppers 13 may be pins, blocks, and the like. In other embodiments, the stoppers 13 may not be used. In such embodiments, the top surface 30 of the stand 14 may be configured to have grooves, depressions or cutouts to engage the support structure 16 of the cask 7.

Although the stand 14 does not extend the full height of cask 7 in the illustrated embodiment, it may be preferred that the stand 14 have a height that is greater than the height of the cask 7 in some embodiments. In order to maximize the benefits of the stand 14, it may be further preferred that the stand 14 have a height that is at least 40% of the depth of the pool in which it is situated.

A method of lowering the cask 7 into a fuel pool according to one embodiment of the present invention will now be described with reference to FIGS. 7-15. While the inventive method will be described in relation to facilitating the transfer of spent fuel from a fuel pool, it is to be understood that the invention is not so limited and can be used in any transport operation that would be benefited by the use of the stand 14.

Figure 7:
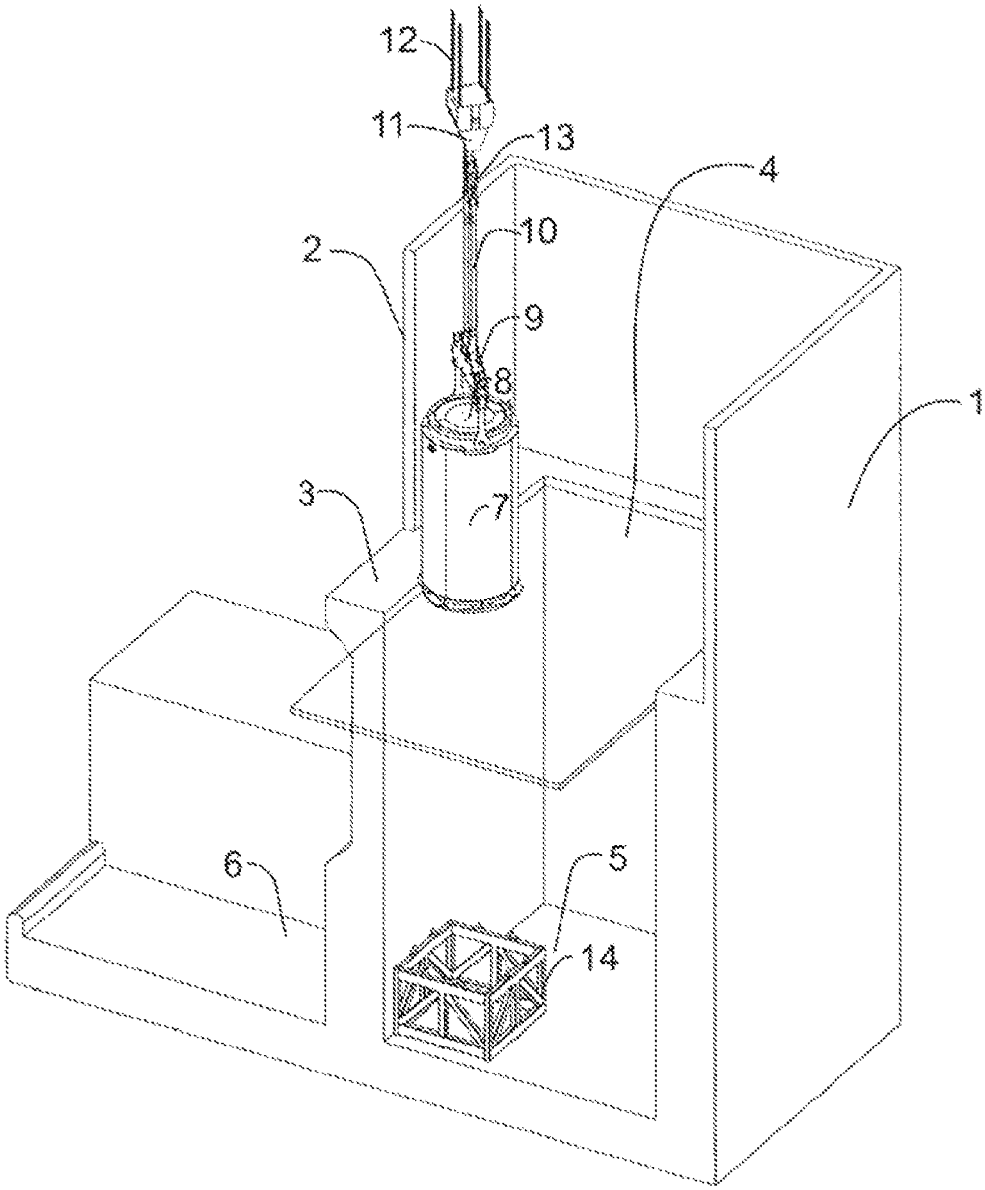
FIG. 7 is a perspective view of a transfer cask being loaded into a fuel pool, according to one embodiment of the present invention, wherein the transfer cask is connected to a crane system.

Referring first to FIG. 7, the cask 7 is connected to a crane, lifted from the poolside area 6 and supported above spent fuel pool 4. More specifically, the cask 7 is attached to crane block 11 via lift yoke 9, extension member 10 and slings 13. The slings 13 are sized to enable cask 7 to be lifted over edge 3 of the spent fuel pool 4. The stand 14 is positioned at the bottom of the fuel pool 4 at a load bearing location.

Figure 8:
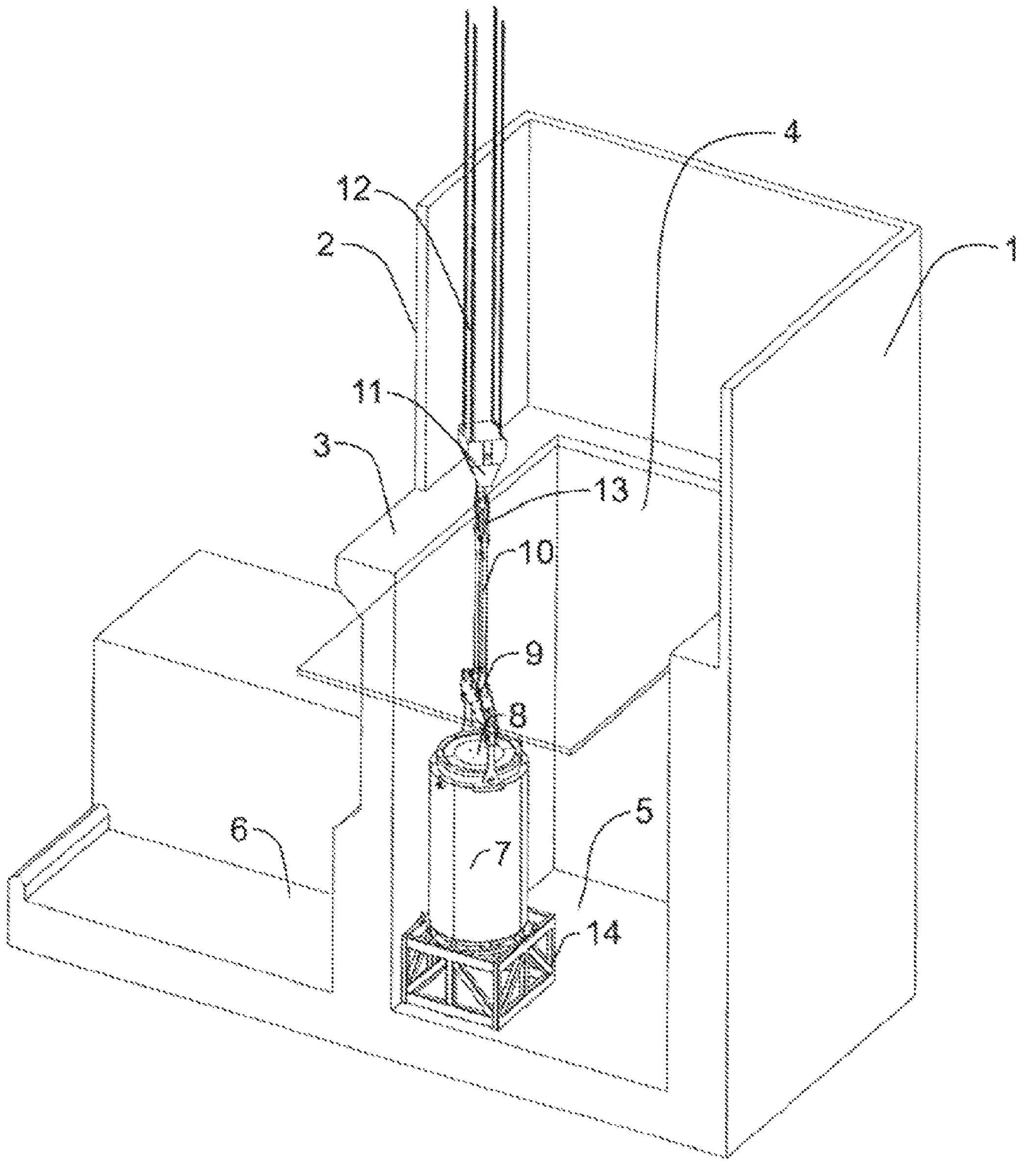
FIG. 8 is a perspective view of a transfer cask being loaded into a fuel pool, according to one embodiment of the present invention, wherein the transfer cask is in the rotational orientation of FIG. 11A and resting atop the stand while attached to the crane system.
Figure 11A:
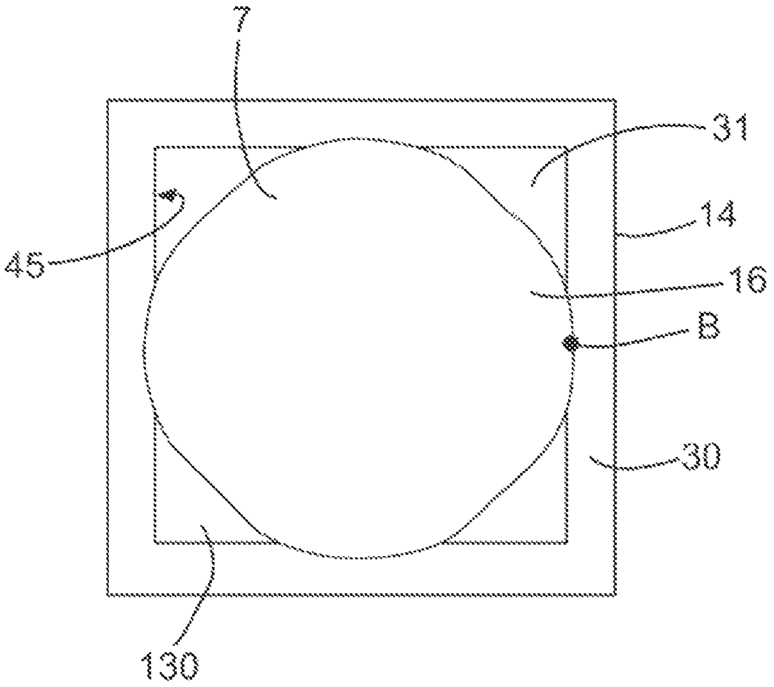
FIG. 11A is a schematic wherein the transfer cask is in a first rotational position that prohibits entry into the cavity of the stand.

The crane then moves the cask 7 into a position directly above the stand 14 and begins to lower the cask 7 into the fuel pool 4, thereby submerging the cask 7. During this lowering procedure, the cask 7 is in a substantially vertical orientation and in a first rotational position about the axis A-A (the first rotational position is shown in FIG. 11A). The cask 7 continues to be lowered into the fuel pool 4 until it contacts and rests atop the stand 14. Referring now to FIG. 8, the cask 7 is supported atop the stand 14 in a substantially vertical orientation, which is shown in detail in FIG. 9.

Referring now to FIG. 9, the cooperation between the stand 14 and the cask 7 during this stage will be described in detail. The cask 7 is positioned above and atop the stand 14. The cask 7 is not secured to the stand 14 but merely rests atop the stand 14 and is maintained in place via surface contact with the stand 14. As such, the cask 7 may be lifted and rotated about its vertical axis A-A without having to access the fuel pool 4 or the need for moving parts.

The cooperation between the support structure 16 of the cask 7 and the top surface 30 of the stand 14 not only supports the cask 7 in a substantially vertical orientation but also prohibits the cask from being lowered into the cavity 31 of the stand 14. More specifically, because the cask 7 is in the first rotational position, which is shown in FIG. 11A, the support structure 16 can not pass through the opening 130 as a result of contacting the top surface 30 of the stand 14.

Referring now to FIG. 11A, the relationship between the support structure 16 and the opening 130 of the stand 14 at this stage is schematically illustrated. The reference point B is added to the support structure 16 to assist in the illustration of the rotational orientation of the cask 7 with respect to the stand 14. The cask 7 is in the first rotational position and is in a substantially vertical orientation. As can be seen, when the cask is in this first rotational position, a portion of the support structure 16 overlaps the top surface 30 of the stand 14 which forms the opening 130. This overlap permits cask 7 to be supported by stand 14 as illustrated in FIG. 9.

Figure 10:
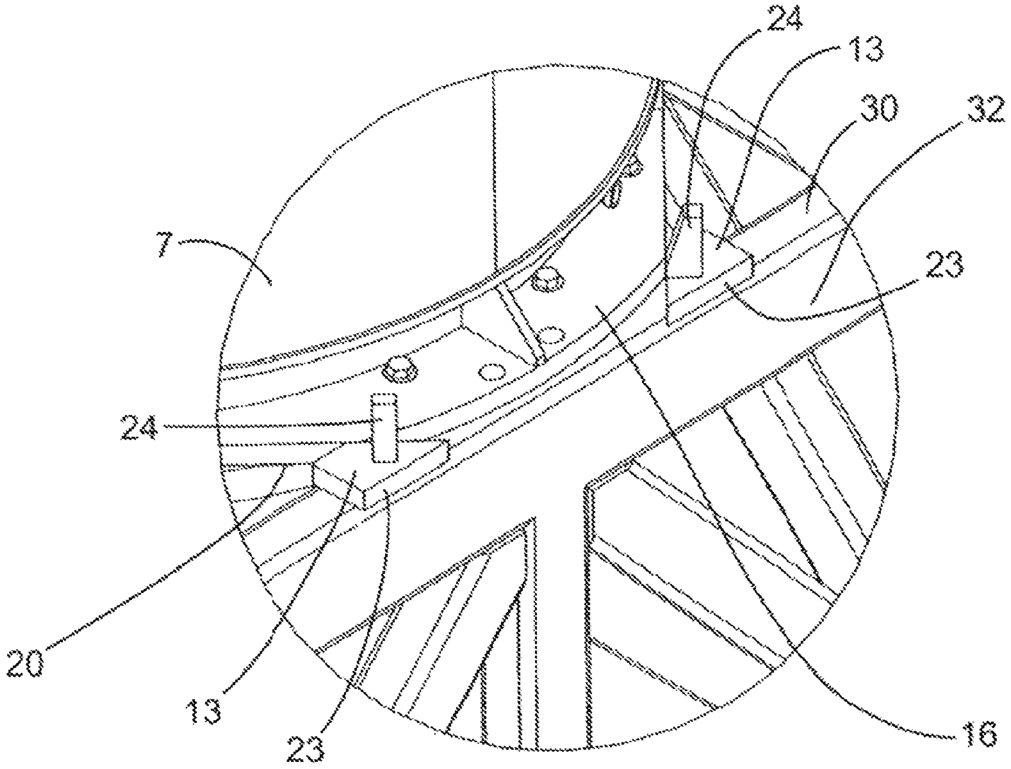
FIG. 10 is a close up view of area IV-IV of FIG. 9 showing the cooperation between the inventive cask and inventive stand.

Referring back to FIG. 9, during the initial lowering step discussed above, the stoppers 13 guide the support structure 13 into the illustrated and desired resting position. Referring now to FIG. 10, a close up of area IV-IV of FIG. 9 that shows the cooperation between the stoppers 13 and the support structure 13 is illustrated. Once the cask 7 is fully resting on the stand 14, the stoppers 13 prohibit the cask 7 from unwanted rotation about its axis A-A via surface contact.

Figure 12:
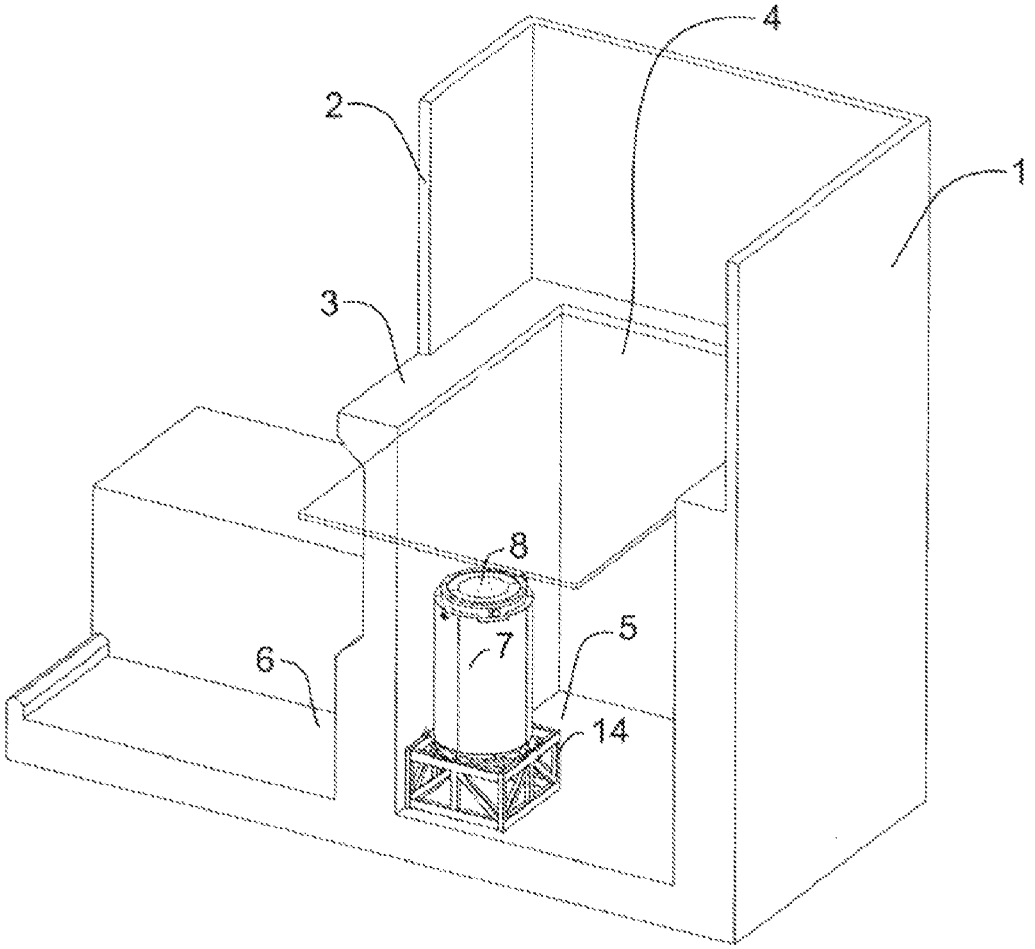
FIG. 12 is a perspective view of a transfer cask being loaded into a fuel pool, according to one embodiment of the present invention, wherein the transfer cask is detached from the crane system and resting atop the stand.
Figure 13:
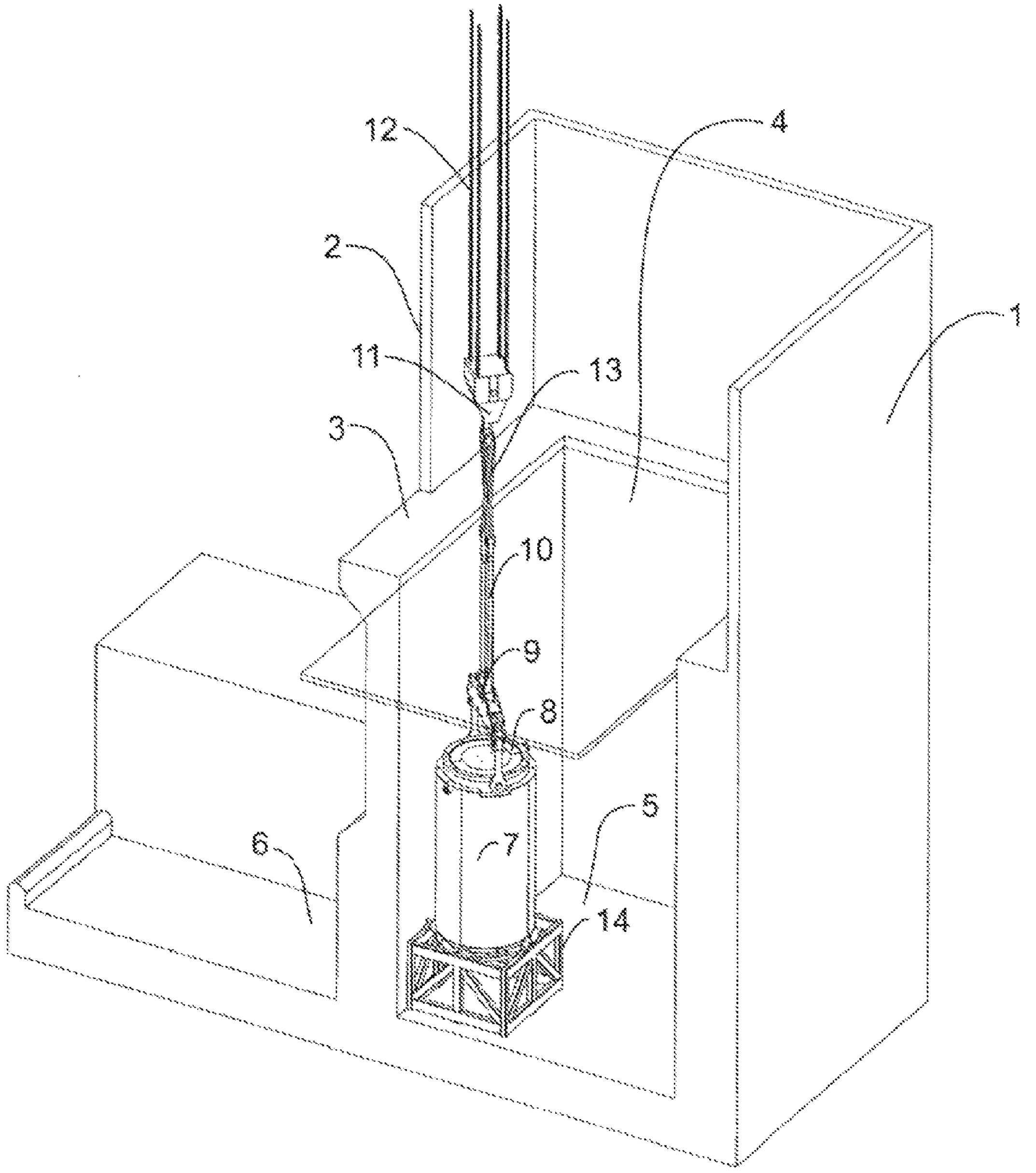
FIG. 13 is a perspective view of a transfer cask being loaded into a fuel pool, according to one embodiment of the present invention, wherein the length of the crane system has been increased and the crane system has been reconnected to the transfer cask resting atop the stand.

Referring now to FIG. 12, once the cask 7 is positioned atop and fully supported by the stand 14, the crane is unattached from the cask 7. Additional length is then added to the crane system in any of the following ways: extension 10 can be extended by telescoping; an additional extension piece may be added to extension 10; slings 13 may be replaced with longer slings; or any other method of extending crane height known in the art. Referring now to FIG. 13, once the crane system has been changed over, the longer crane system is reattached to the cask 7.

Once the longer lifting assembly is reattached to the cask 7, the cask 7 is lifted a small height until its bottom surface clears the stoppers 13. The cask 7 is vertically oriented during this stage. The cask 7 is then rotated about its axis A-A by a non-zero angle until the support structure 16 of the cask 7 is in a second rotational position that allows it to pass through the opening 130 of the stand 14 in an unobstructed manner, as shown in FIG. 11B.

Figure 11B:
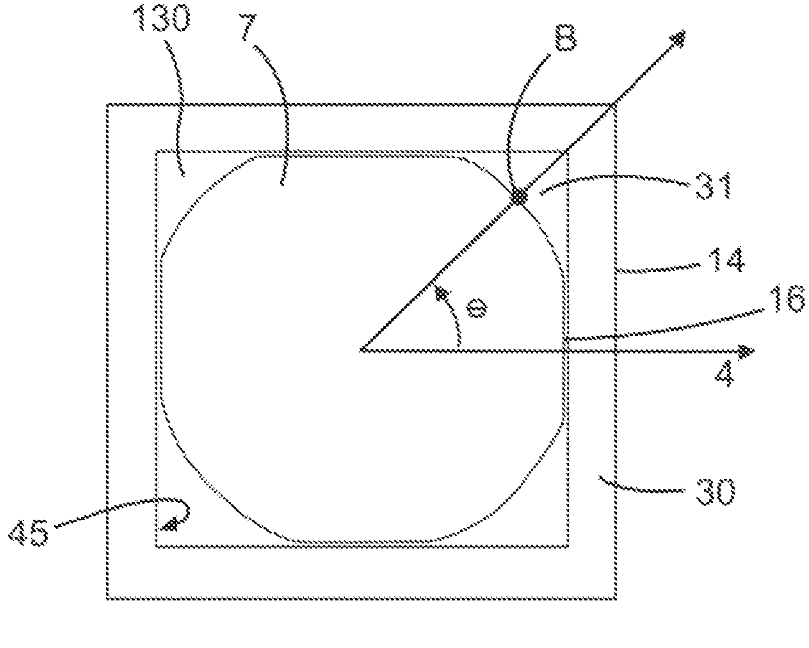
FIG. 11B is a schematic wherein the transfer cask is in a second rotational position that allows entry into the cavity of the stand.

Referring now to FIG. 11B, it can be seen that when the cask 7 is rotated by a nonzero angle θ about axis A-A (which is seen as point A), there is no overlap between the support structure 16 and the top surface 30 of the stand 14. Thus, the support structure 16 can pass through the opening 130 in an unimpeded and unobstructed manner into the cavity 31. In the illustrated embodiment, the angle θ is 45°. However, the invention is not so limited, and any non-zero angle can be used. The rectangular with rounded corners horizontal cross-sectional profile of support structure 16 will function in the above manner with the squared horizontal cross-sectional profile of the opening 130 of stand 14. If, however, the horizontal cross-sectional profile of the opening 130 in stand 14 changes, then the horizontal cross-sectional profile of the support structure 16 must be modified accordingly. The shape and size of the support structure 16 is thus dependent upon the shape and size of opening 130 in the stand 14, and vice-versa.

Figure 14:
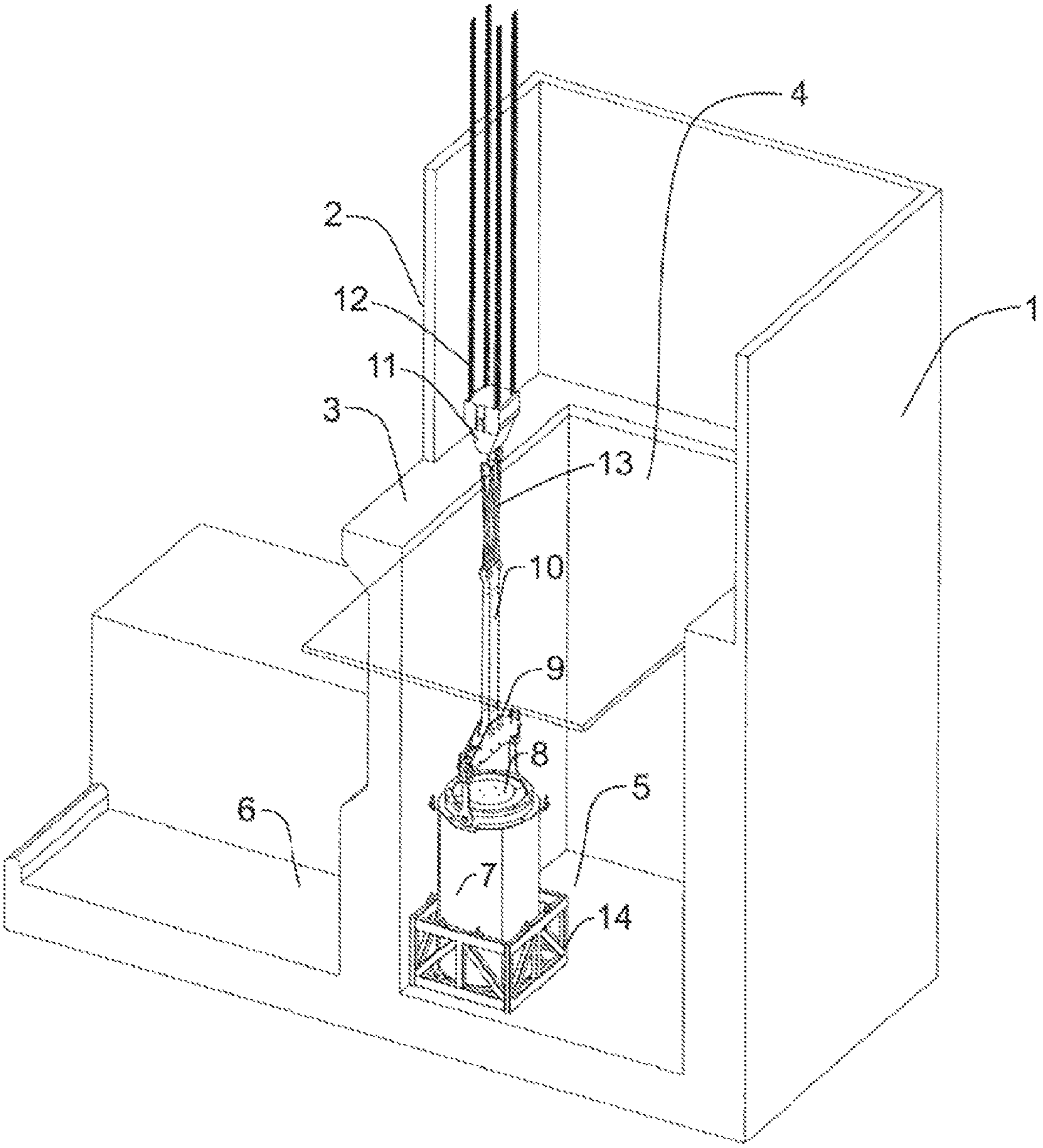
FIG. 14 is a perspective view of a transfer cask being loaded into a fuel pool, according to one embodiment of the present invention, wherein the cask has been rotated to the rotational orientation of FIG. 11B and wherein the cask is fully lowered into the cavity of the stand and is positioned on the bottom of the fuel pool.
Figure 15:
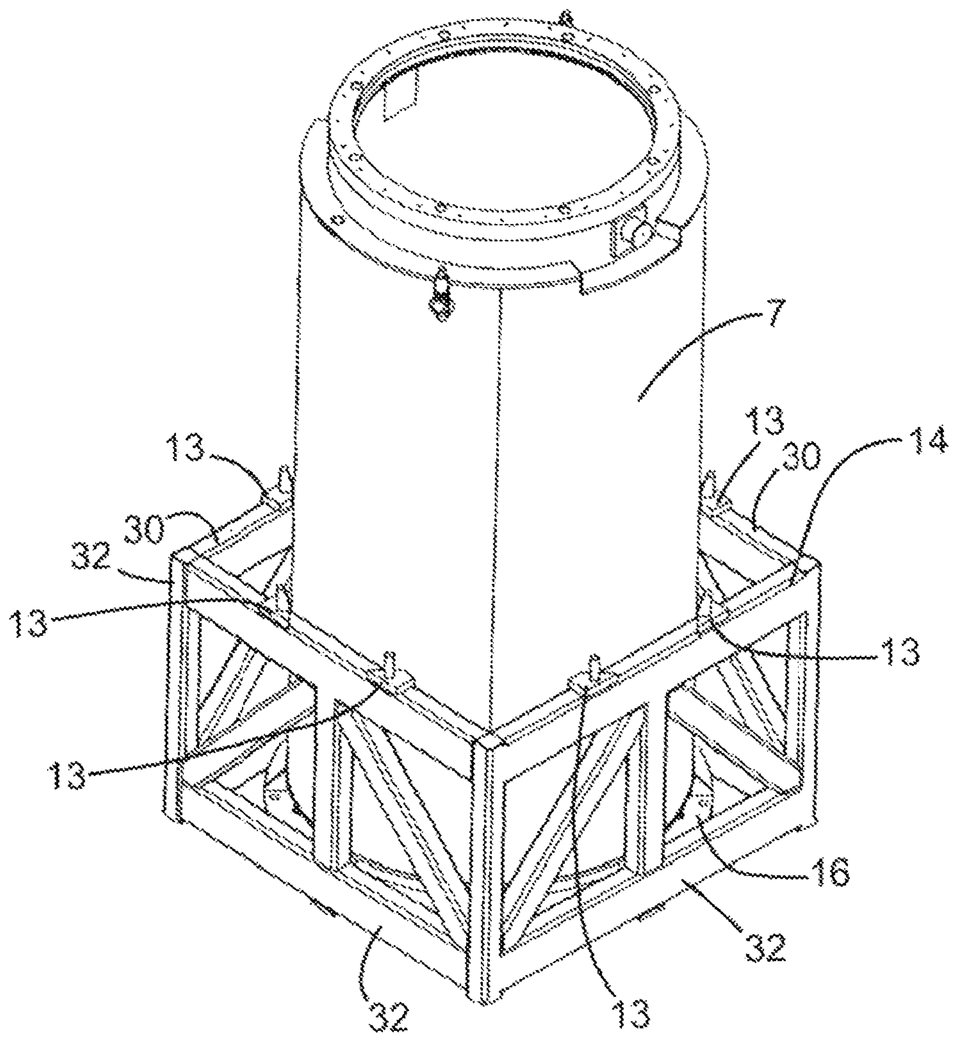
FIG. 15 is a perspective view of the transfer cask resting inside the cavity of the stand as shown in FIG. 14.

Referring now to FIGS. 14 and 15 concurrently, once the cask 7 is rotated into the second rotational position it is lowered into the cavity 31 of the stand 14 until it contacts and rests atop the floor 5 of the fuel pool 4. Once in this position, the cask 7 is loaded with the spent nuclear fuel rods as is customary. The reverse procedure may then be used to remove the fully loaded cask 7 from the fuel pool 4. This method permits the cables 12, as well as cable block 11 to remain dry during all phases of transporting nuclear fuel into and out of the fuel pool 4. Furthermore, all loads are directed to the load-bearing portions of the spent fuel pool floor 5.

The stand 14 can be used in other locations as necessary. For example, the stand 14 could be used to support the cask 7 at the pool surface where a lid 8 and operating features of cask 7 are accessible from the operating sections of the fuel building. This allows the cask 7 to remain in the fuel building while operators prepare the cask 7 for movement from the fuel building. In this case, the stand 14 is suspended from the building structure and hangs down into a fuel transfer pit. The stand 14 could alternatively be used anywhere in the nuclear facility where a procedure will be facilitated by raising a cask 7 by the height of stand 14.

Referring now to FIGS. 16-21 concurrently, a transfer system 100A wherein the stand 14A is a cylindrical shell-like structure is illustrated according to an alternative embodiment of the present invention. The structural components (and their functioning) of the transfer system 100A are in many ways identical to those discussed above with respect to transfer system 100 of FIGS. 1-15 with the major exception that the stand 14A of the transfer system 100A is a cylindrical shell-like structure rather than a box-like frame, as is the case with the stand 14 of the transfer system 100. Therefore, in order to avoid redundancy, only those design aspects of the transfer system 100A that substantially differ from transfer system 100 will be discussed in detail below with the understanding that the remaining structure and components of the transfer system 100A are the same as that discussed above with respect to transfer system 100. Furthermore, like elements of the transfer systems 100A, 100 will have like numerical, identifiers with the addition of the alphabetical suffix A to the numerical identifiers of transfer system 100A.

Figure 16:
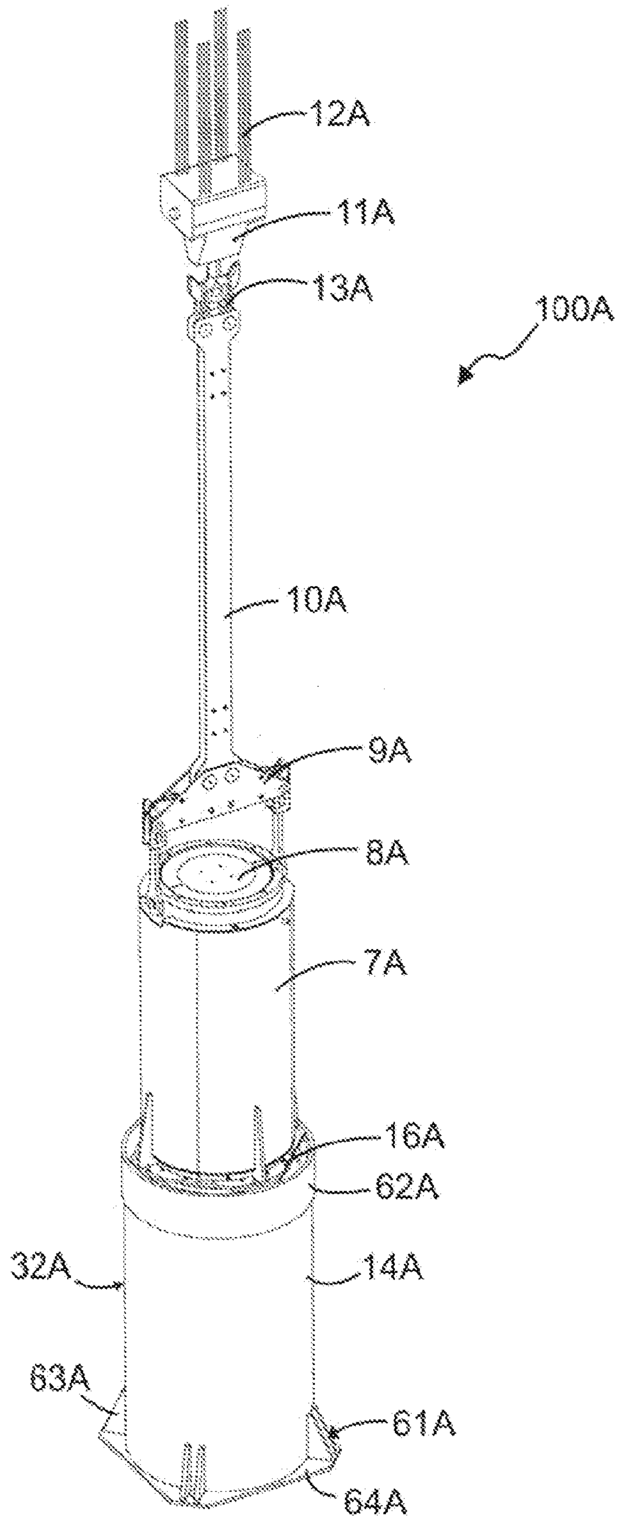
FIG. 16 is a perspective view of the transfer cask resting atop a stand according to a second embodiment of the present invention.

Referring now to FIG. 16, the transfer system 100A generally comprises a cask 7A and a stand 14A. The cask 7A is positioned on top of the stand 14A in a substantially vertical orientation, and thus, has a substantially vertical axis. The cooperation between the cask 7A and the stand 16A is the same as discussed above with respect to the transfer system 100. Specifically, when the cask 7A is at a first rotational position, the cask 7A is supported on top of the stand 14A, and when the cask 7A is rotated about its vertical axis to a second rotational position, the cask 7A enters a cavity 31A of the stand 14A unimpeded.

Figure 17:
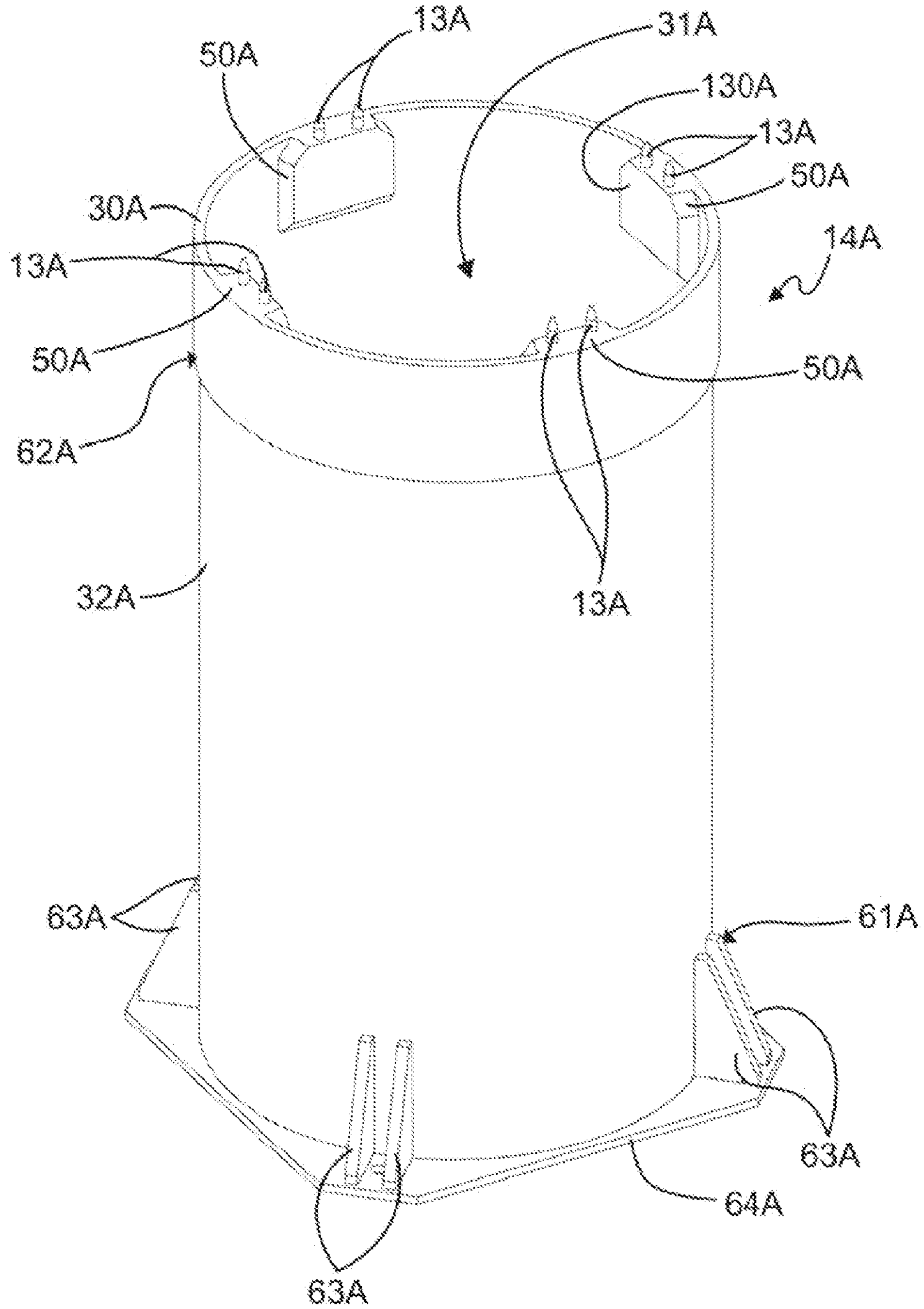
FIG. 17 is a perspective view of the stand of FIG. 16.

Referring now to FIG. 17, the stand 14A is a cylindrical shell-like structure comprising a shell 32A that forms a cavity 31A. The cavity 31A is sized so as to be capable of accommodating the cask 7A. The stand 14A is an integral structure, but for ease of discussion, the stand 14A will be conceptually divided into an upper portion 62A and a lower portion 61A.

The lower portion 61A of the stand 14A is designed to provide stability to the stand 14A, when the stand 14A is supporting the design load. The lower portion 61A comprises a plurality of brackets 63A and a base plate 64A. The brackets 63A extend from the base plate 64A in an upward direction. The brackets are connected to the outer surface of the shell 32A of the stand 14A. The brackets 63A are not limited to the illustrated triangular shape, but may be any shape. The base plate 64A is an octagonal shaped plate like structure. The base plate 64A may be any shape so long as it maintains the stability of the stand 14A in the case of seismic events or other interferences.

The stand 14A further comprises a plurality of blocks 50A positioned at the upper portion 62A. The blocks 50A are positioned at the top of the shell 32A, but the invention is not so limited and the blocks 50A could be positioned at or near the middle of the shell 32A. The blocks 50A are spaced from one another and extend from the inner surface of the shell 32A. In the illustrated embodiment, there are four blocks SOA, positioned equidistant from one another. In alternative embodiments, the number of blocks 50A may vary. The upper surface of the shell 32A together with the blocks 50A form the top surface 30A. The top surface 30A comprises a plurality of pins 13A. The pins 13A are positioned in pairs of two on the upper surface of the blocks SOA. As will be discussed in more detail below, the pins 13A are designed to slidably engage with a plurality of holes 51A (shown in FIG. 19) located on the support structure 16A of the cask 7.

Figure 18:
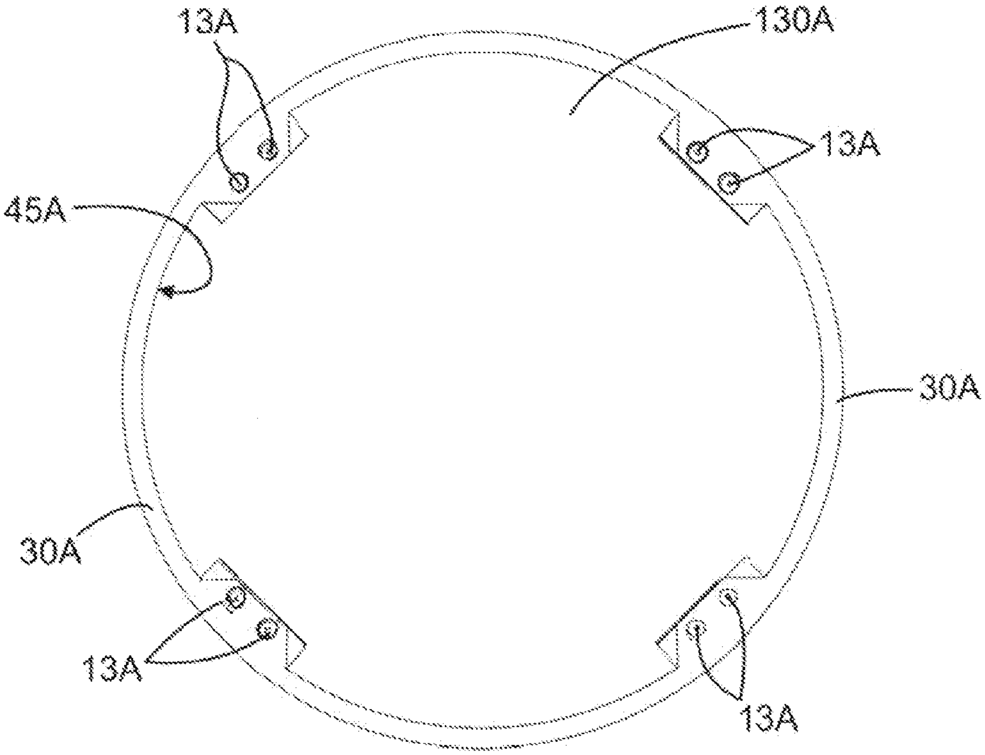
FIG. 18 is a schematic view of the top surface of the stand of FIG. 16.

Referring now to FIG. 18, a schematic view of the top surface 30A is illustrated so that its horizontal cross-sectional profile can be clearly observed. The top surface 30A forms an opening 130A. The opening 130A forms a passageway into the cavity 31A. The opening 130A of the stand 14A has a horizontal cross-sectional profile formed by the internal perimeter 45A of the top surface 30A of the stand 14A. The horizontal cross sectional profile of the opening 130A is a generally circular profile with rectangular shaped cutouts. The size and shape of the opening 130A is designed to interact with the geometry and dimensions of the support structure 16A, as will be discussed with respect to FIG. 20.

Figure 19:
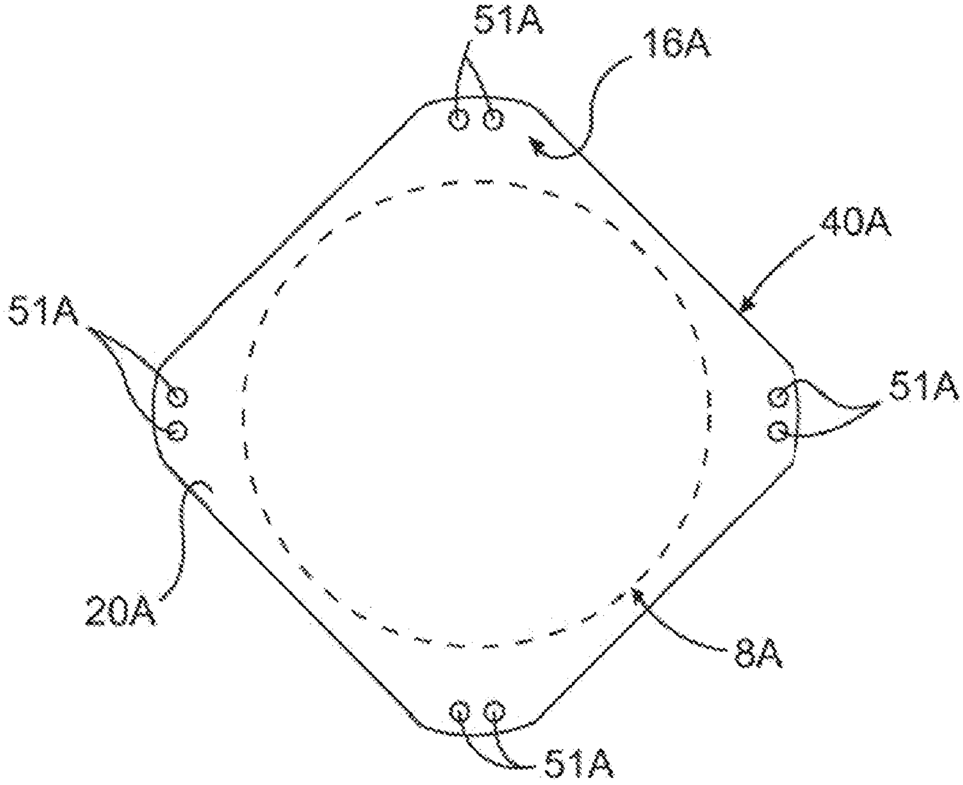
FIG. 19 is a schematic bottom view of the support structure of the cask of FIG. 16.

Referring now to FIG. 19, a bottom schematic view of the support structure 16A is illustrated so that its design details can be clearly observed. The support structure 16A is the same as support structure 16, illustrated in FIG. 4, therefore only the design aspects particularly relevant to the transfer system 100A will be discussed. The support structure 16 has a cross sectional profile formed by an external perimeter 40A that is a generally square shape with rounded edges. The support structure 16A comprises a plurality holes 51A. The holes 51A are in pairs located along the curved sections of the support structure 16A. The holes 51A are designed to slidably engage with the pins 13A (shown in FIGS. 17 and 18) of the stand 14A. When the cask 7A is at a first rotational position, atop the top surface 30A of stand 14A, there is an overlap between the support structure 16A and the top surface 30A of the stand 14A. In that rotational position, the pins 13A of the stand 14A are positioned within the holes 5M of the support structure 16A such that the cask 7A is prevented from unintentionally rotating about its vertical axis.

Figure 20:
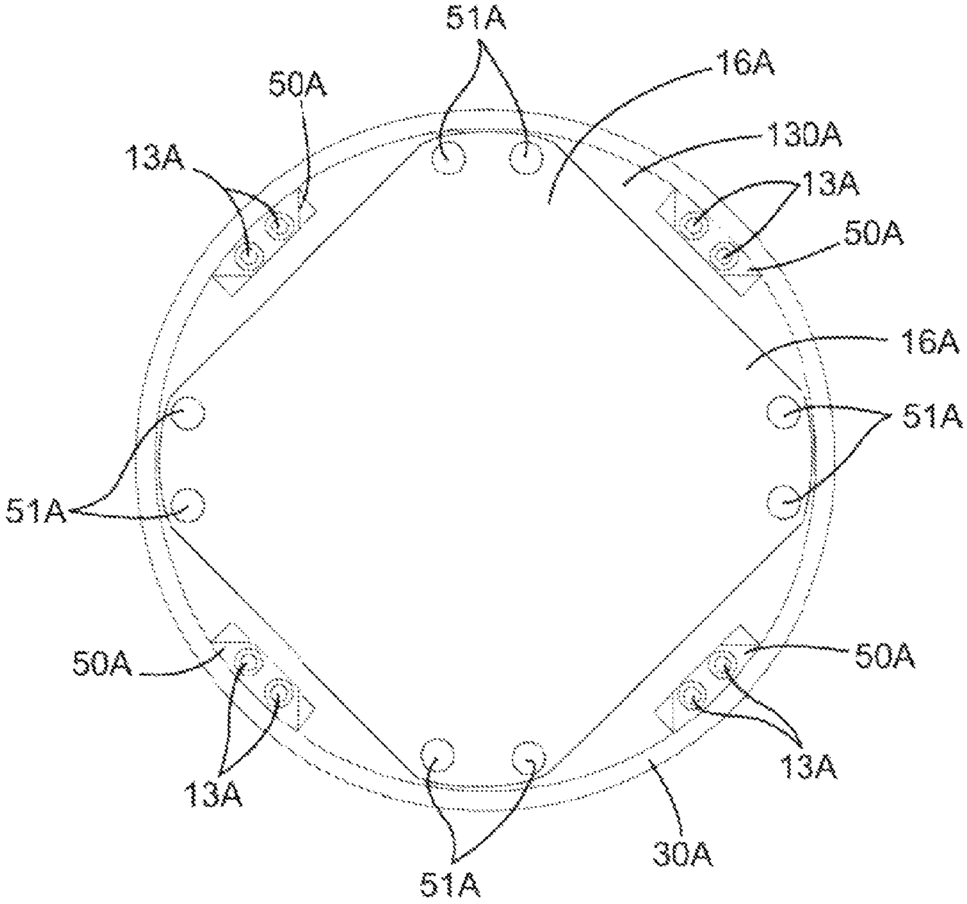
FIG. 20 is a schematic wherein the transfer cask is in a rotational position that allows entry into the cavity of the stand.

As illustrated in FIG. 20, the cask 7A may be lifted to clear the height of the pins 13A and rotated about its vertical axis to a second rotational position so that the support structure 16A passes through the opening 130A in an unimpeded manner. When the cask 7A is in the second rotational position, there is no overlap between the support structure 16A of the cask 7A and the top surface 30A of the stand 14A. Thus, the cask 7A may pass through the opening 130A and into the cavity 31A of the stand 14A.

Figure 21:
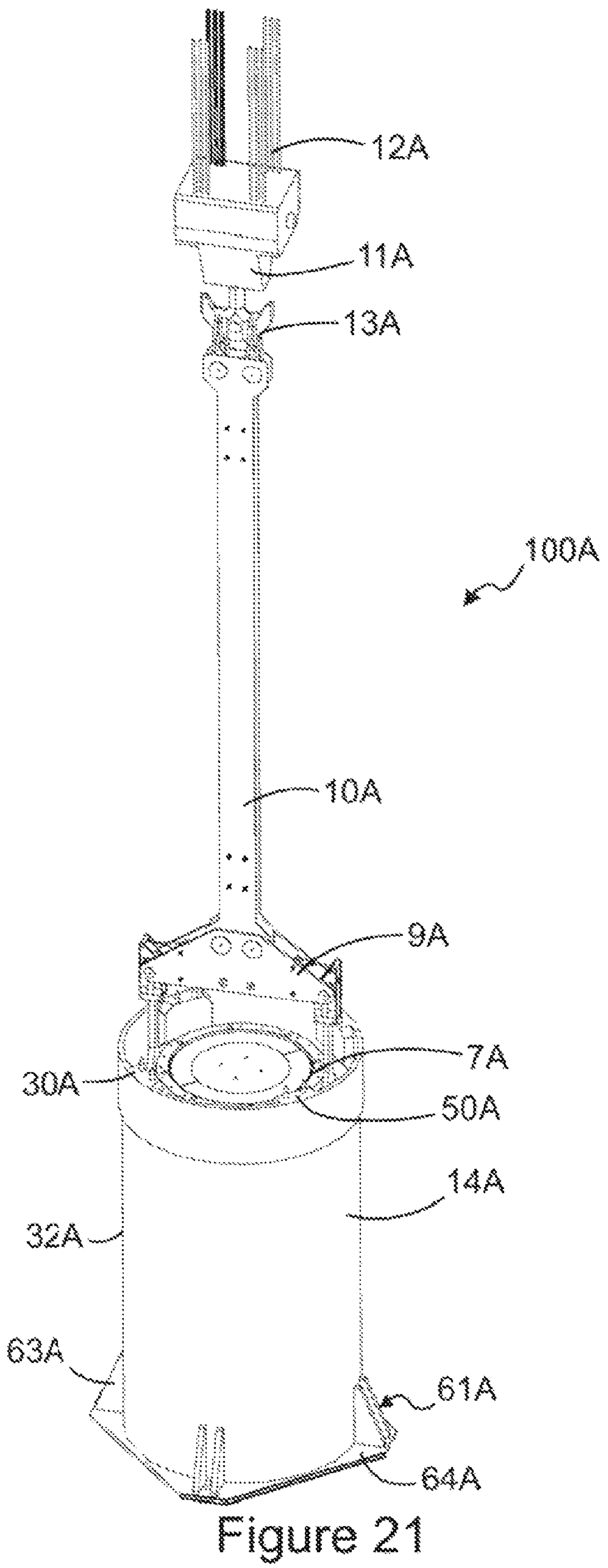
FIG. 21 is a perspective view of the transfer cask resting inside the cavity of the stand of FIG. 16.

As illustrated in FIG. 21, the cask 7A may rest within the stand 14A. Thus, the transfer system 100A may be used in the method discussed with reference to FIGS. 7-15 in the same manner as the transfer system 100.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A system for transferring high level radioactive waste comprising:

a container for receiving high level radioactive waste, the container having a support structure;

a stand comprising a cavity for receiving the container and an opening forming a passageway into the cavity;

wherein the support structure is sized, shaped and/or arranged so that: (i) when the container is substantially vertically oriented in a first rotational position, the support structure can not pass through the opening due to contact between the support structure and the stand; and (ii) when the substantially vertically oriented container is rotated an angle about a vertical axis to a second rotational position, the support structure can pass through the opening in an unobstructed manner.

2. The system of claim 1 further comprising:

the stand having a top surface that surrounds at least a portion of the opening;

the support structure having a bottom surface; and wherein when the container is in the first rotational position, the support structure can not pass through the opening due to surface contact between the bottom surface of the support structure and the top surface of the stand.

3. The system of claim 1 further comprising:

the stand having a top surface that surrounds at least a portion of the opening;

the support structure having a bottom surface; and the bottom surface of the support structure and the top surface of the stand configured so that when the container is in the first rotational position and lowered into contact with the stand, the container is supported by the stand in a substantially vertical orientation.

4. The system of claim 3 wherein the top surface of the stand comprises means for prohibiting rotation of the container about the vertical axis when the container is supported by the stand.

5. The system of claim 4 wherein the prohibition means comprises one or more protuberances protruding from the top surface of the stand.

6. The system of claim 4 wherein the prohibition means comprises a pair of protuberances spaced from one another and extending from the top surface of the stand, the protuberances having a sloped upper surface for guiding a portion of the support structure into contact with the stand between the pair of protuberances.

7. The system of claim 6 comprising a plurality of the pair of protuberances.

8. The system of claim 1 wherein the support structure is a flange.

9. The system of claim 8 further comprising:

the flange having an external perimeter that forms a horizontal cross-sectional profile; the opening having a horizontal cross-sectional profile; and wherein the horizontal cross-sectional profiles of the flange and the opening are sized and shaped relative to one another so that: (i) when the container is substantially vertically oriented in a first rotational position, the flange can not pass through the opening due to contact between the flange and the stand; and (ii) when the substantially vertically oriented container is rotated an angle about a vertical axis to a second rotational position, the flange can pass through the opening in an unobstructed manner.

10. The system of claim 9 wherein the horizontal cross-sectional profile of the flange is rectangular with rounded corners and the horizontal cross-sectional profile of the opening is rectangular.

11. The system of claim 1 wherein the stand has a height and the container has a height, the height of the stand being less than the height of the container.

12. The system of claim 1 wherein the stand is a rigid box-like structure formed by four walls.

13. The system of claim 12 wherein the stand is formed by a plurality of interconnected walls, the walls being frame-like structures.

14. The system of claim 1 wherein the cavity has an open top end formed by the opening and an open bottom end.

15. An apparatus for facilitating the transfer of a container for receiving high level radioactive waste into and/or out of a pool, the container comprising a support structure, the apparatus comprising:

a stand comprising a cavity for receiving the container and an opening forming a passageway into the cavity;

wherein the opening is sized and shaped so that: (i) when the container is substantially vertically oriented in a first rotational position, the support structure can not pass through the opening due to contact between the support structure and the stand; and (ii) when the substantially vertically oriented container is rotated an angle about a vertical axis to a second rotational position, the support structure can pass through the opening in an unobstructed manner.

* * * * *